US010897146B2

(12) United States Patent
Shen

(10) Patent No.: US 10,897,146 B2
(45) Date of Patent: Jan. 19, 2021

(54) BATTERY PROTECTION INTEGRATED CIRCUIT AND BATTERY MANAGEMENT SYSTEM

(71) Applicant: ABLIC Inc., Chiba (JP)

(72) Inventor: Biao Shen, Chiba (JP)

(73) Assignee: ABLIC INC., Chiba (JP)

( * ) Notice: Subject to any disclaimer, the term of this patent is extended or adjusted under 35 U.S.C. 154(b) by 127 days.

(21) Appl. No.: 16/211,937

(22) Filed: Dec. 6, 2018

(65) Prior Publication Data

US 2019/0181661 A1 Jun. 13, 2019

(30) Foreign Application Priority Data

Dec. 8, 2017 (JP) ................................ 2017-235630

(51) Int. Cl.
*H02J 7/00* (2006.01)

(52) U.S. Cl.
CPC ................................ *H02J 7/0026* (2013.01)

(58) Field of Classification Search
USPC ........................................................ 320/128
See application file for complete search history.

(56) References Cited

U.S. PATENT DOCUMENTS

2013/0099753 A1* 4/2013 Shu ...................... H02J 7/0022 320/134
2016/0315486 A1* 10/2016 Shibata ................ H02J 7/0029
2019/0173133 A1* 6/2019 Shen .................... H02J 7/0031
2019/0181661 A1* 6/2019 Shen .................... H02J 7/0026

FOREIGN PATENT DOCUMENTS

JP 2014-124039 A 7/2014

* cited by examiner

*Primary Examiner* — Mohammed Alam
(74) *Attorney, Agent, or Firm* — Brinks Gilson & Lione

(57) ABSTRACT

A battery protection integrated circuit which is used to construct a system configured to serially communicate among a plurality of the battery protection integrated circuits, the battery protection integrated circuit includes: a higher-level transmission terminal; a lower-level reception terminal; an acquisition device configured to acquire transmission information to transmit to the higher-level circuit; and a storage configured to store at least one of transmitted information transmitted from the lower-level circuit and the transmission information acquired by the acquisition device, the battery protection IC being configured to transmit, in response to reception of instructive information indicating an instruction for the higher-level circuit to read the transmitted information, one of the transmitted information and the transmission information from the higher-level transmission terminal to the higher-level circuit, and simultaneously receive, by the lower-level reception terminal, transmitted information transmitted from the lower-level circuit after the transmitted information.

8 Claims, 9 Drawing Sheets

BATTERY PROTECTION INTEGRATED CIRCUIT AND BATTERY MANAGEMENT SYSTEM

RELATED APPLICATIONS

This application claims priority under 35 U.S.C. § 119 to Japanese Patent Application No. 2017-235630 filed on Dec. 8, 2017, the entire content of which is hereby incorporated by reference.

BACKGROUND OF THE INVENTION

1. Field of the Invention

The present invention relates to a battery protection integrated circuit and a battery management system.

2. Description of the Related Art

Hitherto, there has been known a battery management system including battery protection devices which protect a power supply system which includes a plurality of battery packs connected in series, and a master device which performs serial communication with the plurality of cascade-connected battery protection devices to collect information of the battery packs (for example, refer to Japanese Patent Application Laid-open No. 2014-124039).

In the above-mentioned system, the reference potential for operation of each battery protection device differs for each reference potential of the battery pack under protection. The voltage of signal transmitted and received in serial communication is hence converted by voltage converters between the battery protection devices. The signal delays by passing through the voltage converters. When the master unit and the plurality of cascade-connected battery protection devices communicate with one another, communication delays as the number of transmission and reception through the voltage converter increases.

SUMMARY OF THE INVENTION

The present invention has been made to provide a battery protection integrated circuit and a battery management system with which effects of delay caused by voltage converters can be reduced in serial communication through the voltage converters.

According to one aspect of the present invention, there is provided a battery protection integrated circuit, a plurality of the battery protection ICs which operate at different reference potentials being connected in series via a reference potential converter to construct a system configured to serially communicate among the plurality of the battery protection ICs, the battery protection IC including: a higher-level transmission terminal connected to a reception terminal of a higher-level circuit that is adjacent in cascade connection and is configured to transmit information to the higher-level circuit; a lower-level reception terminal connected to a transmission terminal of a lower-level circuit that is adjacent in the cascade connection and is configured to receive information from the lower-level circuit; an acquisition device configured to acquire transmission information to be transmitted to the higher-level circuit; and a storage in which at least one of transmitted information transmitted from the lower-level circuit or the transmission information acquired by the acquisition device is stored, the battery protection IC being configured to transmit, in response to reception of instructive information indicating an instruction to read one of the transmission information and the transmitted information, the one of the transmitted information and the transmission information from the higher-level transmission terminal to the higher-level circuit, and simultaneously receive, by the lower-level reception terminal, one of transmission information of the lower-level circuit and transmitted information stored in the lower-level circuit transmitted from the lower-level circuit after the one of the transmission information and the transmitted information.

According to one embodiment of the present invention, it is possible to provide the battery protection integrated circuit and the battery management system with which effects of delay caused by the voltage converters can be reduced in the serial communication through the voltage converters.

DETAILED DESCRIPTION OF THE PREFERRED EMBODIMENTS

Embodiment

Now, an embodiment of the present invention is described by referring to the accompanying drawings.

<Outline of Battery Management System 1>

Figure 1:
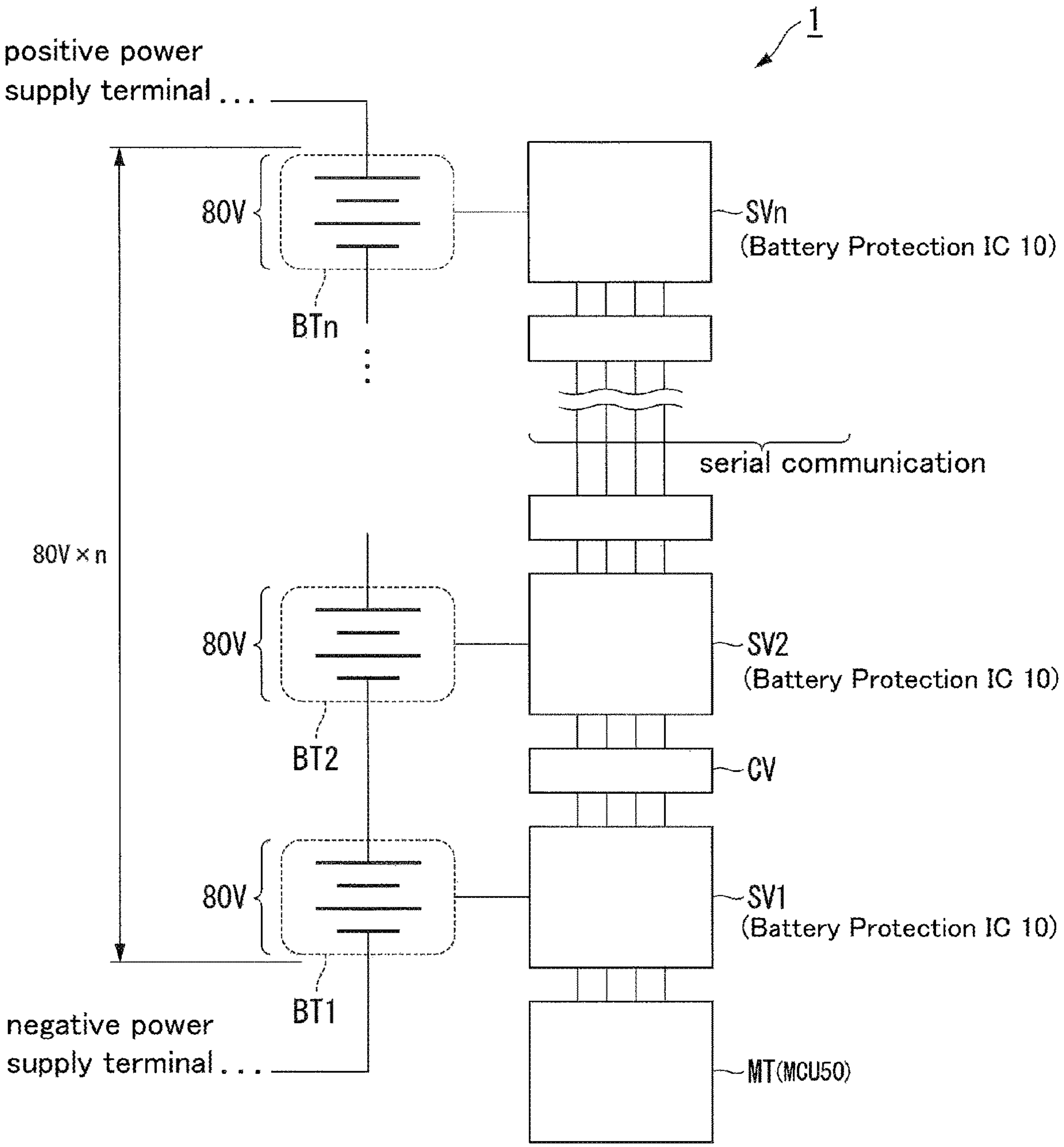
FIG. 1 is a diagram for schematically illustrating a battery management system using battery protection integrated circuits according to an embodiment of the present invention.

FIG. 1 is a diagram for schematically illustrating a battery management system 1 using battery protection integrated circuits (hereinafter referred to as "ICs") according to an embodiment of the present invention.

As illustrated in FIG. 1, the battery management system 1 includes a plurality of DC voltage sources BTs (hereinafter referred to as "battery packs BT1 to BTn"), a plurality of battery protection devices SVs (hereinafter referred to as "battery protection devices SV1 to SVn"), a plurality of voltage converters CVs, and an information collection device MT. In the following description, when the battery packs BT1 to BTn are not distinguished from one another, the battery packs BT1 to BTn are collectively referred to as the "battery packs BTs", and when the battery protection devices SV1 to SVn are not distinguished from one another, the battery protection devices SV1 to SVn are collectively referred to as the "battery protection devices SVs".

The plurality of battery packs BTs is connected in series to one another to supply a voltage desired by a user. In the illustrated example, n (n>0) battery packs BTs, namely, the battery pack BT1 to the battery pack BTn are connected in series to one another, and one battery pack BT supplies a voltage of 80 V. A voltage of n times 80 V can be thus supplied by the battery packs BT1 to the battery pack BTn. A negative terminal of the battery pack BT1 is connected to a negative power supply terminal of a supplied device to which a DC power supply is supplied, and a positive terminal of the battery pack BTn is connected to a positive power supply terminal of the supplied device. In the above description, there has been described the case in which the voltage of 80 V is supplied by each of the battery packs BTs, but the present invention is not limited thereto. Of the plurality of battery packs BTs had in the battery management system 1, a part of the battery packs BTs may supply a voltage that is different from those of the other part of battery packs BTs. For example, there may be adopted a configuration in which two battery packs each supplying the voltage of 80 V and one battery pack supplying a voltage of 40 V are connected in series to one another to supply 200 V.

The battery protection device SV is provided for each of the battery packs BTs to monitor state of each battery pack BT, such as a voltage value and a charging rate of the battery pack BT, and protect the battery pack BT. In the illustrated example, the battery protection devices SV1 to SVn monitor and protect the battery packs BT1 to BTn, respectively.

The information collection device MT receives information indicating states of the battery packs BTs respectively acquired by the battery protection devices SV through serial communication. In the embodiment, the serial communication between the battery protection devices SV and the information collection device MT is achieved by a serial peripheral interface (SPI), for example. Moreover, in the serial communication between the battery protection devices SV and the information collection device MT, a master device is the information collection device MT, and slave devices are the battery protection devices SV. Between the battery protection devices SV and the information collection device MT, four kinds of lines, namely, a data transmission line, a data reception line, a clock line, and a chip select signal line are provided. In the following description, the four kinds of lines are collectively referred to as "communication lines". The communication lines are cascade-connected between each pair of adjacent battery protection devices SVs via a voltage converter CV. The data transmission line and the data reception line may be used in common. In this case, the common line is used for transmitting commands and data from the higher-level circuit to the lower-level circuit in a normal operation, and is used for transmitting data from the lower-level circuit to the higher-level circuit in an operation of reading battery information, etc. The types of communication lines between the battery protection ICs 10 can be reduced by determining in advance the operations of the common line as described above.

Here, each of the battery protection devices SVs operates on a reference potential of the battery pack BT under protection (for example, potential of a negative terminal of the battery pack BT) for the reference potential for operation. The battery packs BT1 to BTn are connected in series to one another, and hence have reference potentials that are different from one another. For example, the battery protection device SV2 has a reference potential for operation that is higher by that of the battery pack BT1 (in this example, 80 V) under protection of the battery protection device SV1. The voltage converter CV converts the reference potential for operation for signals transmitted and received through the communication lines between the battery protection device SV1 and the battery protection device SV2. Specifically, in the signals from the battery protection device SV1 to the battery protection device SV2 the reference potential is stepped up by 80 V by the voltage converter CV before transmission. Moreover, in the signals from the battery protection device SV2 to the battery protection device SV1 the reference potential is stepped down by 80 V by the voltage converter CV before transmission. The voltage converter CV is provided between two adjacent battery protection devices SV to convert reference voltages of signals transmitted and received between the battery protection devices SVs in the same manner as described above.

A battery protection devices SV has a battery protection IC 10. The information collection device MT has a micro control unit (MCU) 50. In the following description, the cascade connection between the information collection device MT and the battery protection devices SVs is also referred to as "cascade connection between the battery protection ICs 10 and the MCU 50". A battery protection IC 10 executes processing regarding the serial communication with the MCU 50 or another battery protection IC 10. The MCU 50 executes processing regarding the serial communication with the battery protection IC 10. In the following description, of the battery protection ICs 10 cascade-connected to the MCU 50, a battery protection IC 10 closer to the MCU 50 is referred to as a "higher-level circuit", and a battery protection IC 10 farther from the MCU 50 is referred to as a "lower-level circuit".

<Regarding Delay Caused by Voltage Converter CV>

Here, in serial communication signals transmitted and received through the voltage converters CVs delays depending on the time for voltage conversion by the voltage converters CVs. The time for the serial communication between the MCU 50 and the battery protection IC 10 becomes longer as the battery protection IC 10 is a much lower-level circuit, that is, as the number of the voltage conversions by the voltage converters CVs becomes larger. In the battery protection IC 10 according to the embodiment the effects of the delay caused by the voltage converters CVs is reduced in the serial communication by executing, by the MCU 50, an instruction to transmit battery information BTI of each battery protection IC 10 at once. Details of configurations of the battery protection ICs 10 and the MCU 50 are described below.

<Internal Configuration of Battery Protection IC 10>

Figure 2:
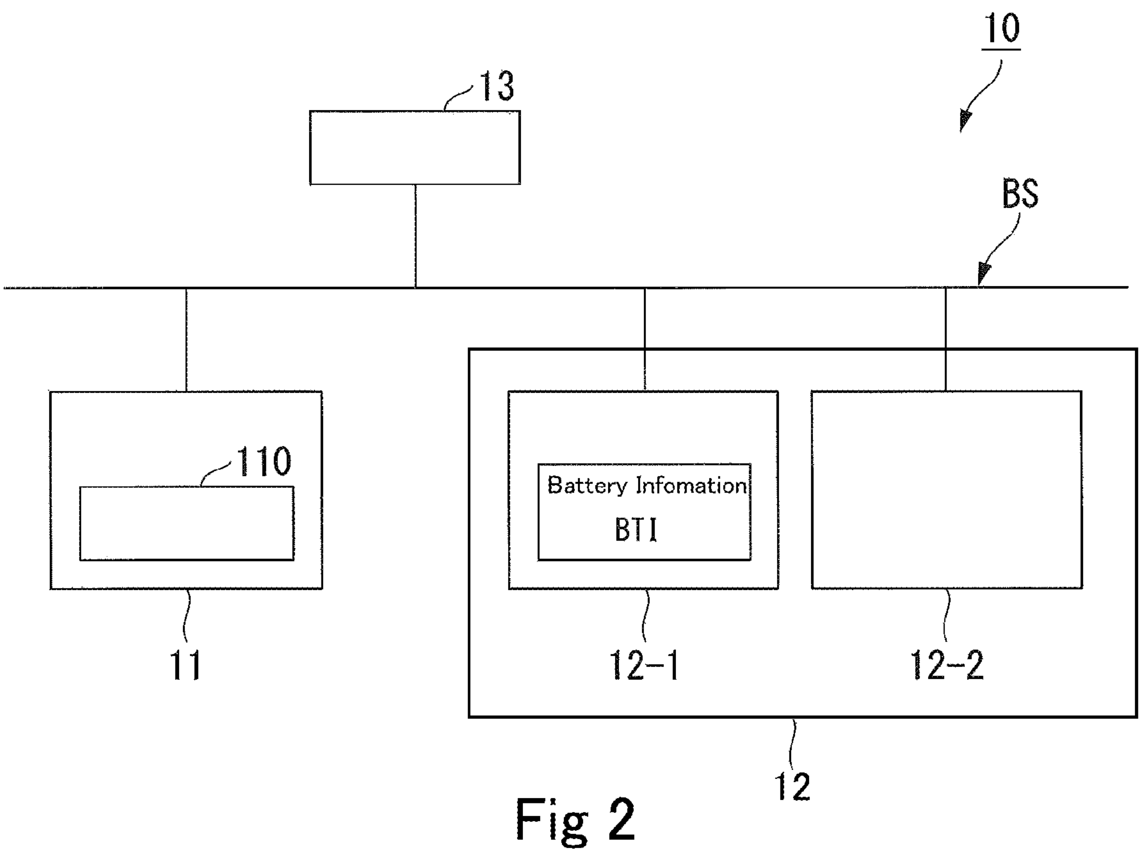
FIG. 2 is a diagram for illustrating an example of a configuration of a battery protection integrated circuit according to the embodiment.

FIG. 2 is a diagram for illustrating an example of a configuration of the battery protection IC 10 according to the embodiment.

As illustrated in FIG. 2, the battery protection IC 10 includes a controller 11, a storage 12, and a communication unit 13, for example. The components included in the battery protection IC 10 are connected to one another so that information can be transmitted and received through an internal bus BS. The controller 11 implements an acquisition device 110 as its functional unit when a central processing unit (CPU) or other hardware processor executes a program (software), for example. Moreover, a part or all (excluding a storage included therein) of the controller 11 may be implemented by a large scale integration (LSI), an application specific integrated circuit (ASIC), a field-programmable gate array (FPGA), a graphics processing unit (GPU), or other hardware (circuit portion including circuitry), or may be implemented through cooperation of software and hardware. The acquisition device 110 acquires and stores battery information BTI of a battery pack BT under protection at all times or at predetermined time intervals. The acquisition device 110 may have a configuration to acquire and store the battery information BTI based on an instruction from the MCU 50.

The storage 12 is implemented by a random access memory (RAM), a register, or the like. As illustrated in FIG. 2, the storage 12 includes two storage areas: a first storage 12-1 and a second storage 12-2, for example. In the first storage 12-1, data for transmission through the serial communication is temporarily stored. Moreover, in the second storage 12-2, data received through the serial communication is temporarily stored. The battery information BTI acquired and stored by the acquisition device 110 is stored in the first storage 12-1 when the battery information BTI is transmitted to the higher-level circuit through the serial communication based on the instruction from the MCU 50. The battery information BTI stored in the first storage 12-1 is an example of transmission information including the battery information BTI of its own circuit. Moreover, information stored in the second storage 12-2 is an example of transmitted information from the lower-level circuit including the battery information BTI of the lower-level circuit.

The communication unit 13 performs serial communication with the MCU 50 or another battery protection IC 10 under control of the controller 11. The communication unit 13 includes four terminals connected to the adjacent higher-level circuit through the communication lines, and four terminals connected to the adjacent lower-level circuit through the communication lines. Details of the connection between the battery protection IC 10 and other battery protection ICs are described below.

<Configuration of Battery Protection Device SV>

Figure 3:
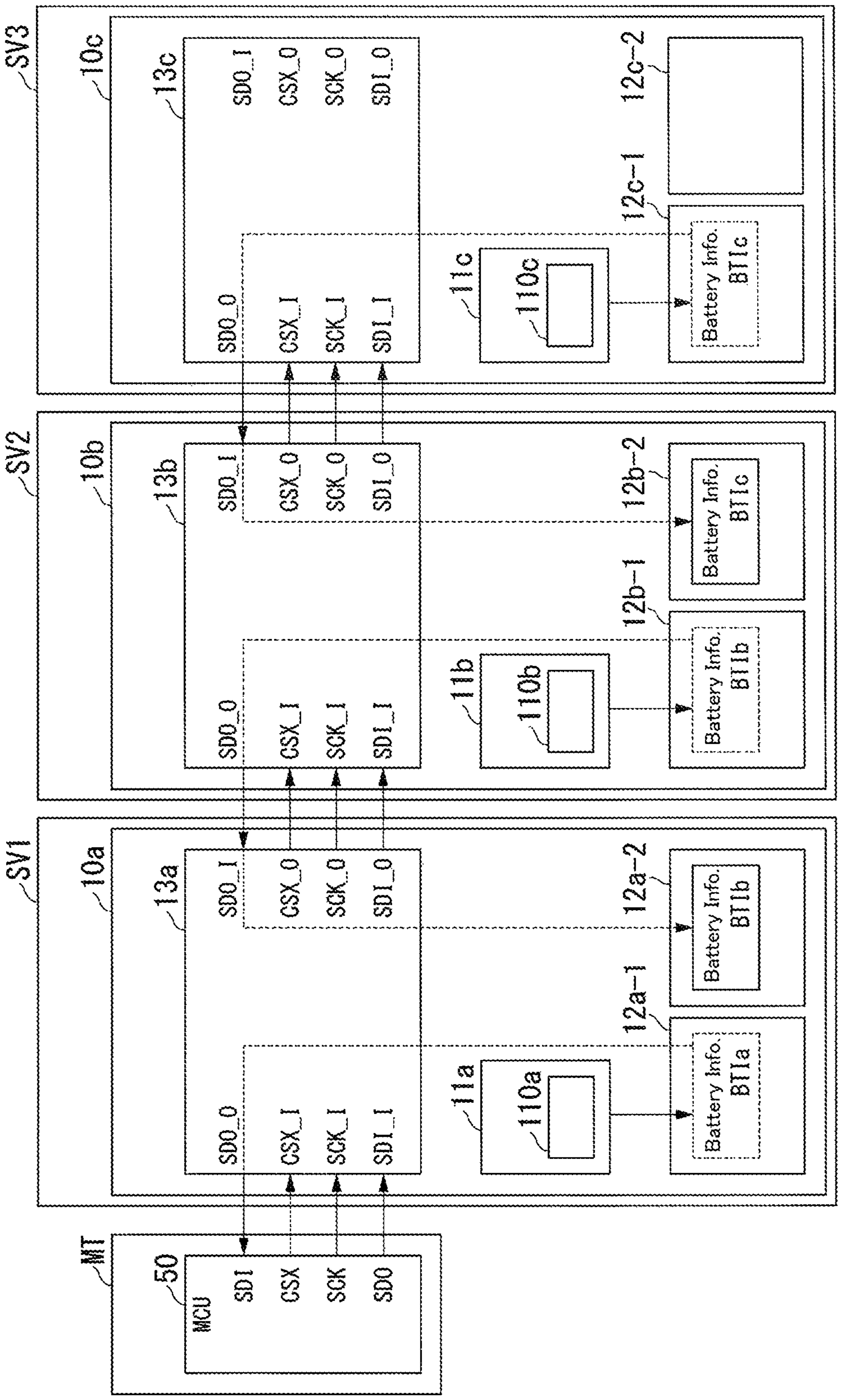
FIG. 3 is a diagram for conceptually illustrating a first state of the battery protection integrated circuits according to the embodiment.

FIG. 3 is a diagram for conceptually illustrating a first state of the battery protection ICs 10 according to the embodiment.

In the following description, of the battery protection devices SVs included in a battery management system 1, a battery protection IC 10 included in the battery protection device SV1 is notated as a "battery protection IC 10*a*", a battery protection IC 10 included in the battery protection device SV2 is notated as a "battery protection IC 10*b*", and a battery protection IC 10 included in the battery protection device SV3 is notated as a "battery protection IC 10*c*". Moreover, components relating to the battery protection IC 10*a* are denoted by reference symbols suffixed by "a". Moreover, components relating to the battery protection IC 10*b* are denoted by reference symbols suffixed by "b". Moreover, components relating to the battery protection IC 10*c* are denoted by reference symbols suffixed by "c". Further, when the components are not distinguished from one another as to which battery protection IC 10 the components relate to, the suffix "a", "b", or "c" is omitted.

Moreover, in the example illustrated in FIG. 3 to FIG. 7, a description of the voltage converters CVs arranged between the battery protection device SV1 and the battery protection device SV2, and between the battery protection device SV2 and the battery protection device SV3 is omitted, and description is given with assumption that the signals between the battery protection devices SVs are changed in voltage by the voltage converter CV.

<Connection of Communication Unit 13>

The communication unit 13 includes the following four terminals connected to the adjacent higher-level circuit through the communication lines: a data transmission terminal SDO_O, a chip select reception terminal CSX_I, a clock reception terminal SCK_I, and a data reception terminal SDI_I.

The data transmission terminal SDO_O is connected to a data reception terminal of the adjacent higher-level circuit through the data transmission line. When the adjacent higher-level circuit is the MCU 50, the data reception terminal connected to the data transmission terminal SDO_O through the data transmission line is a data reception terminal (illustrated data reception terminal SDI) of the MCU 50. Moreover, when the adjacent higher-level circuit is another battery protection IC 10, the data reception terminal connected to the data transmission terminal SDO_O through the data transmission line is a data reception terminal SDO_I of the other battery protection IC 10.

The chip select reception terminal CSX_I is connected to a chip select transmission terminal of the adjacent higher-level circuit through the chip select signal line. When the adjacent higher-level circuit is the MCU 50, the chip select transmission terminal connected to the chip select reception terminal CSX_I through the chip select signal line is a chip select transmission terminal (illustrated chip select transmission terminal CSX) of the MCU 50. Moreover, when the adjacent higher-level circuit is another battery protection IC 10, the chip select transmission terminal connected to the chip select reception terminal CSX_I through the chip select signal line is a chip select transmission terminal CSX_O of the other battery protection IC 10.

The clock reception terminal SCK_I is connected to a clock transmission terminal of the adjacent higher-level circuit through the clock line. When the adjacent higher-level circuit is the MCU 50, the clock transmission terminal connected to the clock reception terminal SCK_I through the clock line is a clock transmission terminal (illustrated clock transmission terminal SCK) of the MCU 50. Moreover, when the adjacent higher-level circuit is another battery protection IC 10, the clock transmission terminal connected to the clock reception terminal SCK_I through the clock line is a clock transmission terminal SCK_O of the other battery protection IC 10.

The data reception terminal SDI_I is connected to a data transmission terminal of the adjacent higher-level circuit through the data reception line. When the adjacent higher-level circuit is the MCU 50, the data transmission terminal connected to the data reception terminal SDI_I through the data reception line is a data transmission terminal (illustrated data transmission terminal SDO) of the MCU 50. Moreover, when the adjacent higher-level circuit is another battery protection IC 10, the data transmission terminal connected to the data reception terminal SDI_I through the data transmission line is a data transmission terminal SDI_O of the other battery protection IC 10.

The communication unit 13 also includes the following four terminals connected to the adjacent lower-level circuit through the communication lines: a data reception terminal SDO_I, a chip select transmission terminal CSX_O, a clock transmission terminal SCK_O, and a data transmission terminal SDI_O. The data reception terminal SDO_I is connected to a data transmission terminal SDO_O of the adjacent lower-level circuit through the data transmission line. The chip select transmission terminal CSX_O is connected to a chip select reception terminal CSX_I of the adjacent lower-level circuit through the chip select signal line. The clock transmission terminal SCK_O is connected to a clock reception terminal SCK_I of the adjacent lower-level circuit through the clock line. The data transmission terminal SDI_O is connected to a data reception terminal SDI_I of the adjacent lower-level circuit through the data reception line.

<Regarding Terminals>

A description is now given of the terminals included in the communication unit 13. To the clock reception terminal SCK_I, a clock signal is supplied from the higher-level circuit. The clock transmission terminal SCK_O supplies, to the lower-level circuit, the clock signal supplied to the clock reception terminal SCK_I. The communication unit 13 performs transmission and reception of data based on the clock signal. Specifically, the data transmitted and received by the data transmission terminal SDO_O and the data reception terminal SDI_I with the higher-level circuit is transmitted and received in synchronization with rise or fall of the clock signal. Moreover, data transmitted and received by the data reception terminal SDO_I and the data transmission terminal SDI_O with the lower-level circuit is transmitted and received in synchronization with the rising or falling of the clock signal.

To the chip select reception terminal CSX_I, the chip select signal is supplied from the higher-level circuit. The chip select transmission terminal CSX_O supplies, to the lower-level circuit, the chip select signal supplied to the chip select reception terminal CSX_I. The chip select signal is supplied by the information collection device MT (MCU 50) which is the master device of the serial communication and indicates the battery protection IC 10 with which the serial communication is performed. Specifically, the chip select signal takes two states: high level and low level. Of the battery protection ICs 10, the battery protection IC 10 to which the chip select signal having low level is supplied performs transmission and reception of the data with the higher-level circuit and the lower-level circuit.

The data reception terminal SDO_I receives data from the lower-level circuit. Moreover, the data transmission terminal SDO_O transmits the data received by the data reception terminal SDO_I or the battery information BTI of the battery pack BT under protection by the battery protection IC 10 to the higher-level circuit. The data reception terminal SDI_I receives data from the higher-level circuit. The data transmission terminal SDI_O transmits data to the lower-level circuit.

<First State of Battery Protection IC 10>

As illustrated in FIG. 3, description is given with assumption that the battery information BTI is stored in the acquisition device 110 of each battery protection IC 10. Moreover, description is given with assumption that, under the first state, the battery protection ICs 10 have received from the MCU 50 an instruction for all the battery protection ICs to transmit the battery information BTI at once. Described below is operation of the battery protection ICs 10 after the battery protection IC 10*a* receives information including the instruction. The "instruction to transmit the battery information BTI at once" is an example of an instructive information indicating an instruction for the battery protection ICs to transmit a part (for example, only voltage value or only battery pack temperature) or all of the battery information BTI of each battery pack BT to the MCU 50 for reception.

In response to reception of the instruction, the communication unit 13*a* transmits battery information BTIa stored in the first storage 12*a*-1 to the MCU 50. Moreover, at the same time as transmitting the battery information BTIa, the communication unit 13*a* receives battery information BTIb stored in the first storage 12*b*-1 from the battery protection IC 10*b*. The controller 11*a* has the received battery information BTIb store in the second storage 12*a*-2.

At the same time as transmitting the battery information BTIb to the battery protection IC 10*a*, the communication unit 13*b* receives battery information BTIc stored in the first storage 12*c*-1 from the battery protection IC 10*c*. The controller 11*b* stores the received battery information BTIc in the second storage 12*b*-2.

<Second State of Battery Protection IC 10>

Figure 4:
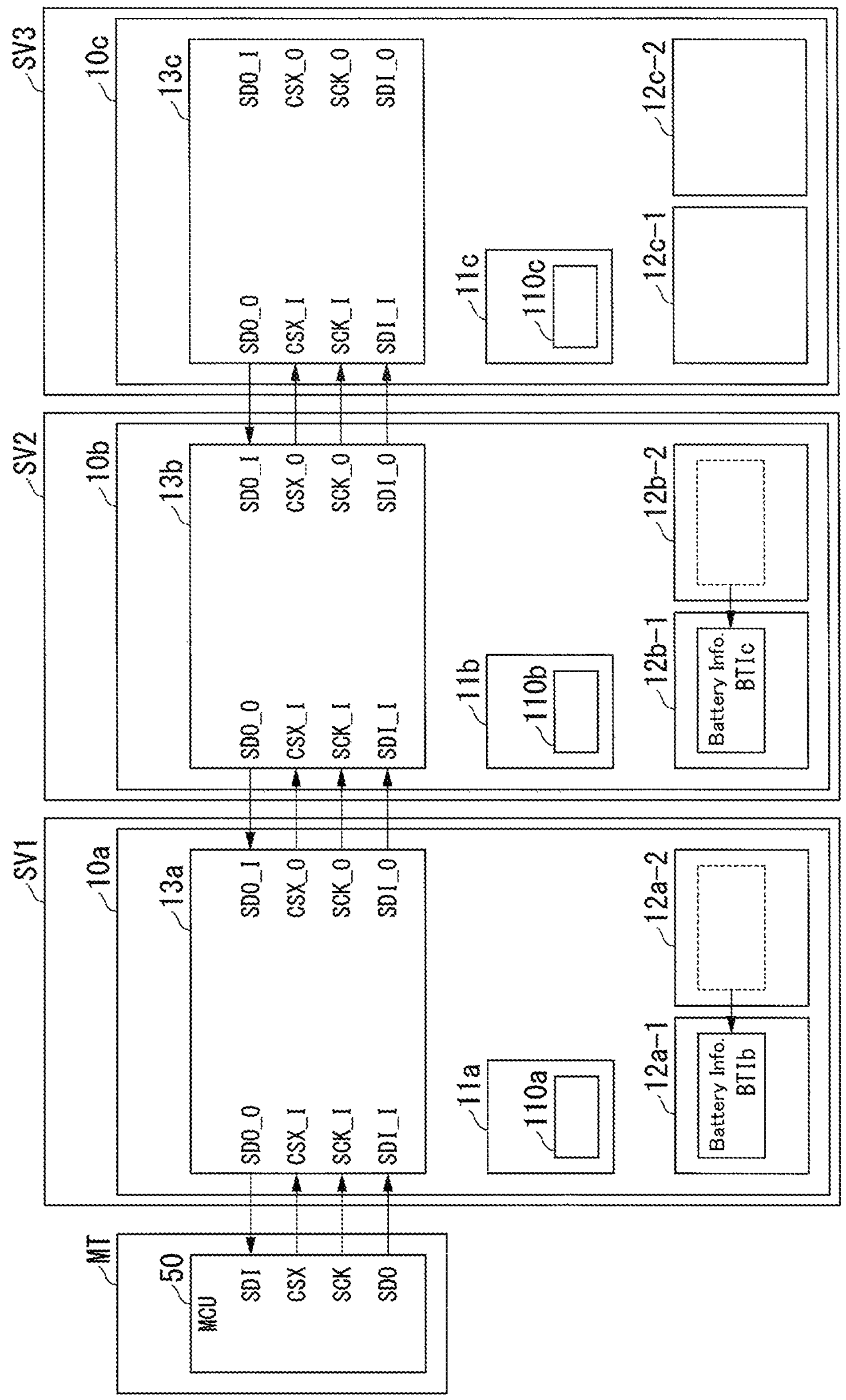
FIG. 4 is a diagram for conceptually illustrating a second state of the battery protection integrated circuits according to the embodiment.

FIG. 4 is a diagram for conceptually illustrating a second state of the battery protection ICs 10 according to the embodiment.

The second state is a state after the first state, and a state in which the battery information BTI of an adjacent lower-level circuit received from the lower-level circuit is stored in the second storage 12-2.

At a timing when the transmission of the battery information BTIa and the reception of the battery information BTIb have completed, the controller 11*a* has the battery information BTIb stored in the second storage 12*a*-2 store in the first storage 12*a*-1. Moreover, at a timing when the transmission of the battery information BTIb and the reception of battery information BTIc have completed, the controller 11*b* has the battery information BTIc stored in the second storage 12*b*-2 store in the first storage 12*b*-1.

<Third State of Battery Protection IC 10>

Figure 5:
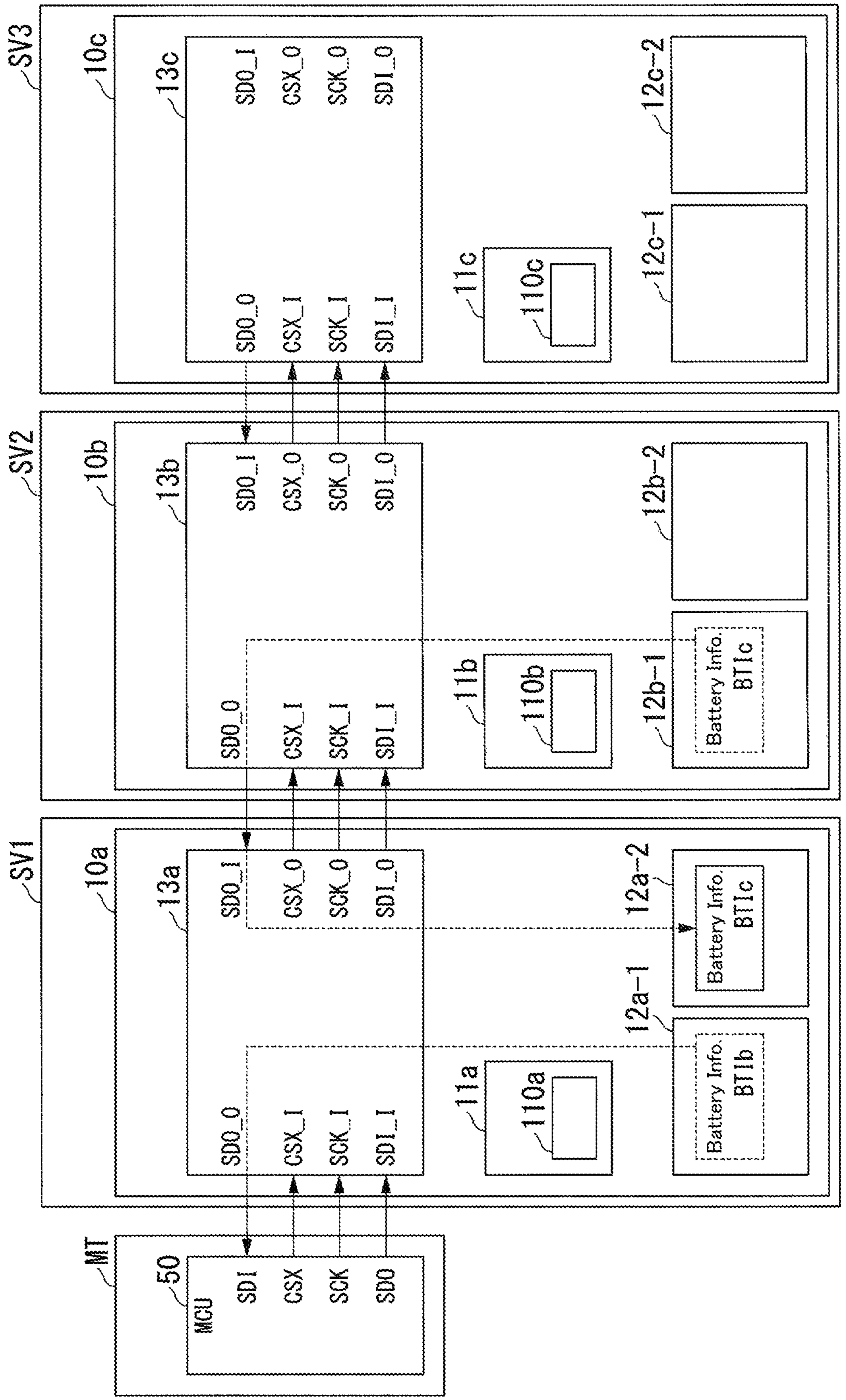
FIG. 5 is a diagram for conceptually illustrating a third state of the battery protection integrated circuits according to the embodiment.

FIG. 5 is a diagram for conceptually illustrating a third state of the battery protection ICs 10 according to the embodiment.

The third state is a state after the second state, and a state in which the battery information BTI of an adjacent lower-level circuit received from the lower-level circuit is stored in the first storage 12-1.

The communication unit 13*a* transmits the battery information BTIb stored in the first storage 12*a*-1 to the MCU 50. Moreover, at the same time as transmitting the battery information BTIb, the communication unit 13*a* receives the battery information BTIc stored in the first storage 12*b*-1 from the battery protection IC 10*b*. The controller 11*a* has the received battery information BTIc store in the second storage 12*a*-2.

<Fourth State of Battery Protection IC 10>

Figure 6:
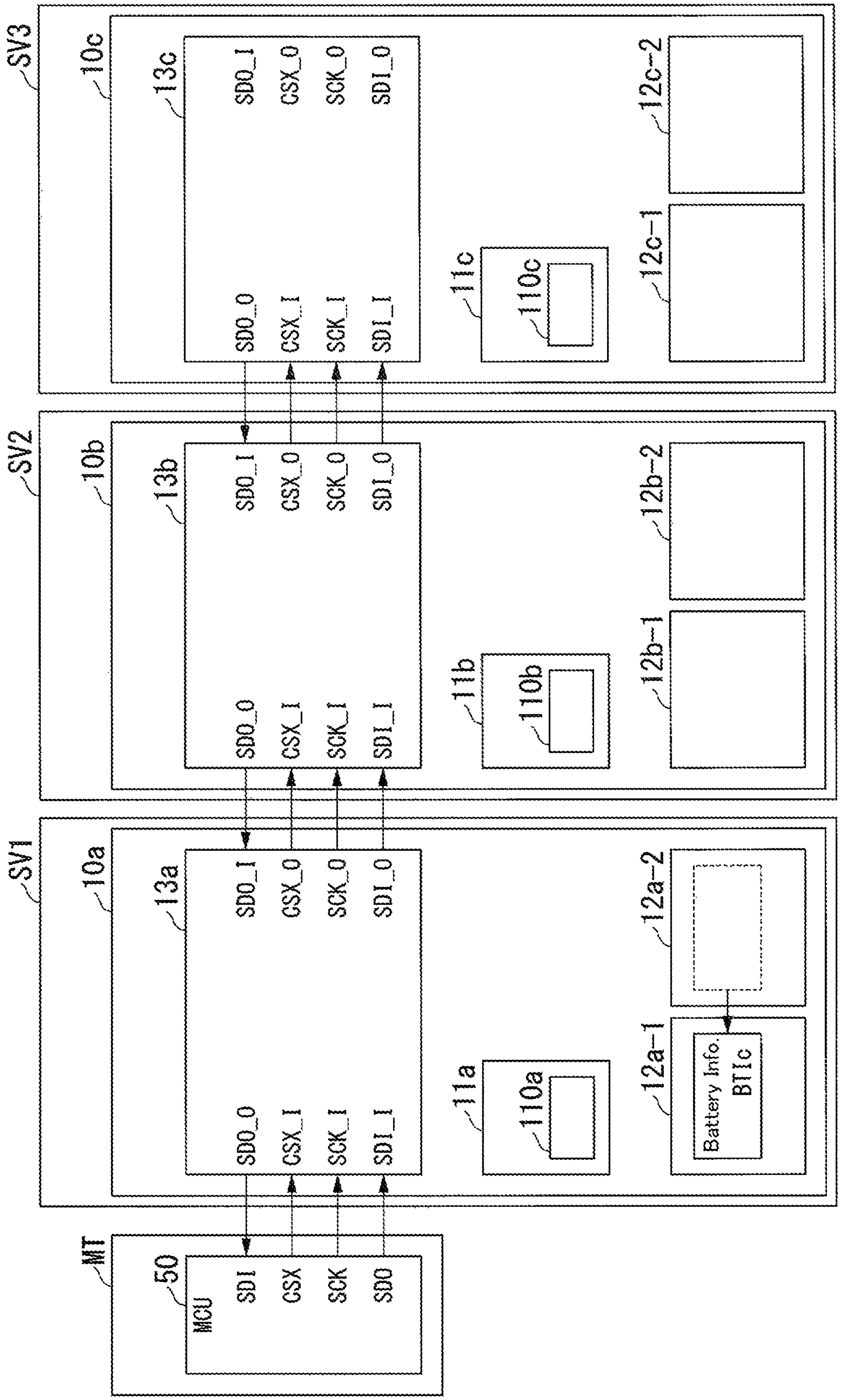
FIG. 6 is a diagram for conceptually illustrating a fourth state of the battery protection integrated circuits according to the embodiment.

FIG. 6 is a diagram for conceptually illustrating a fourth state of the battery protection ICs 10 according to the embodiment.

The fourth state is a state after the third state, and a state in which battery information BTI that has been received from the adjacent lower-level circuit and has been received from a much lower-level circuit than the lower-level circuit is stored in the second storage 12-2.

At a timing when the transmission of the battery information BTIb and the reception of battery information BTIc have completed, the controller 11*a* has the battery information BTIc stored in the second storage 12*a*-2 store in the first storage 12*a*-1.

<Fifth State of Battery Protection IC 10>

Figure 7:
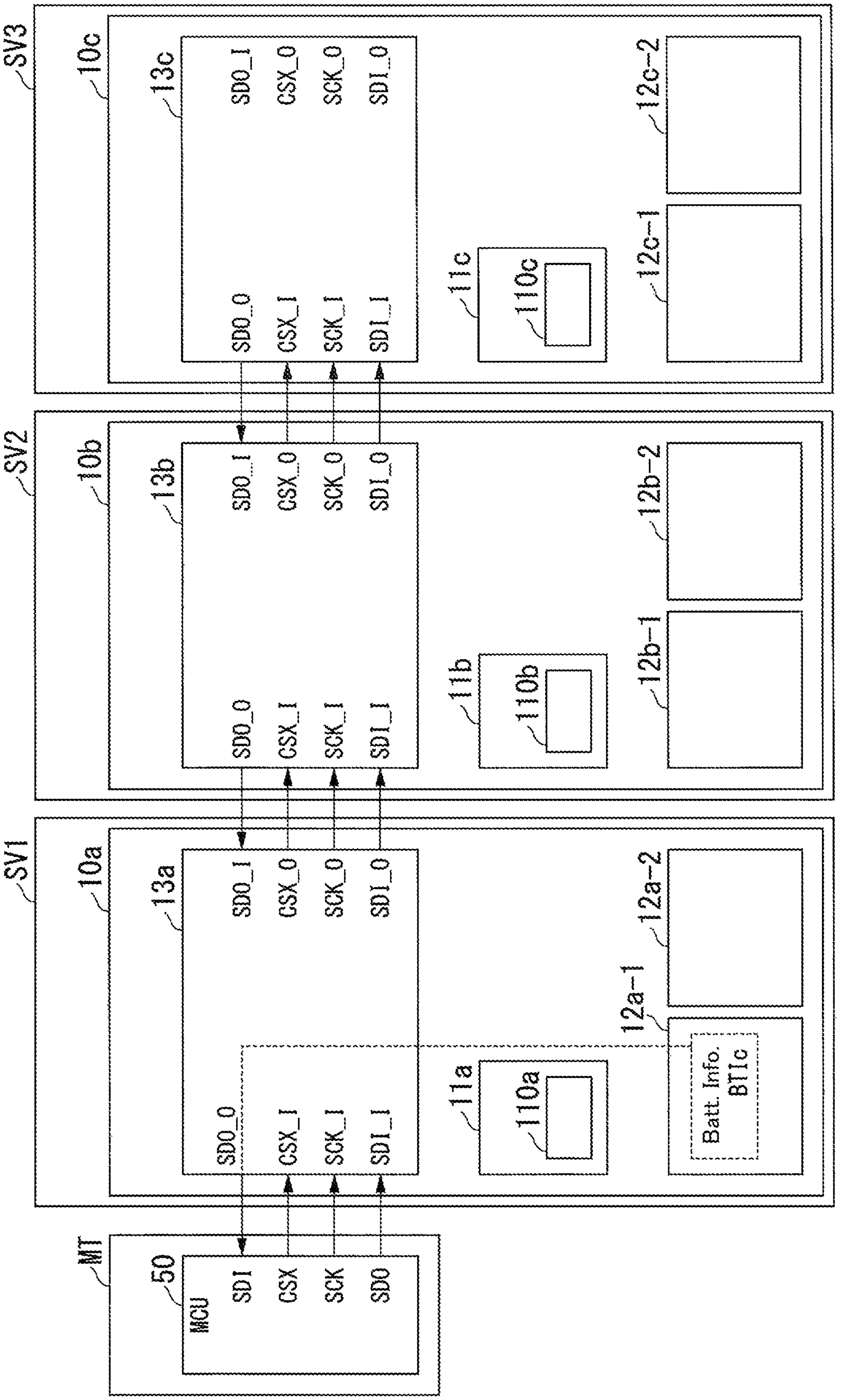
FIG. 7 is a diagram for conceptually illustrating a fifth state of the battery protection integrated circuits according to the embodiment.

FIG. 7 is a diagram for conceptually illustrating a fifth state of the battery protection ICs 10 according to the embodiment.

The fifth state is a state after the fourth state, and a state in which the battery information BTI that has been received from the adjacent lower-level circuit and has been received from a much lower-level circuit than the lower-level circuit is stored in the first storage 12-1.

The communication unit 13*a* transmits the battery information BTIc stored in the first storage 12*a*-1 to the MCU 50.

<Regarding Required Time for Serial Communication>

Figure 8:
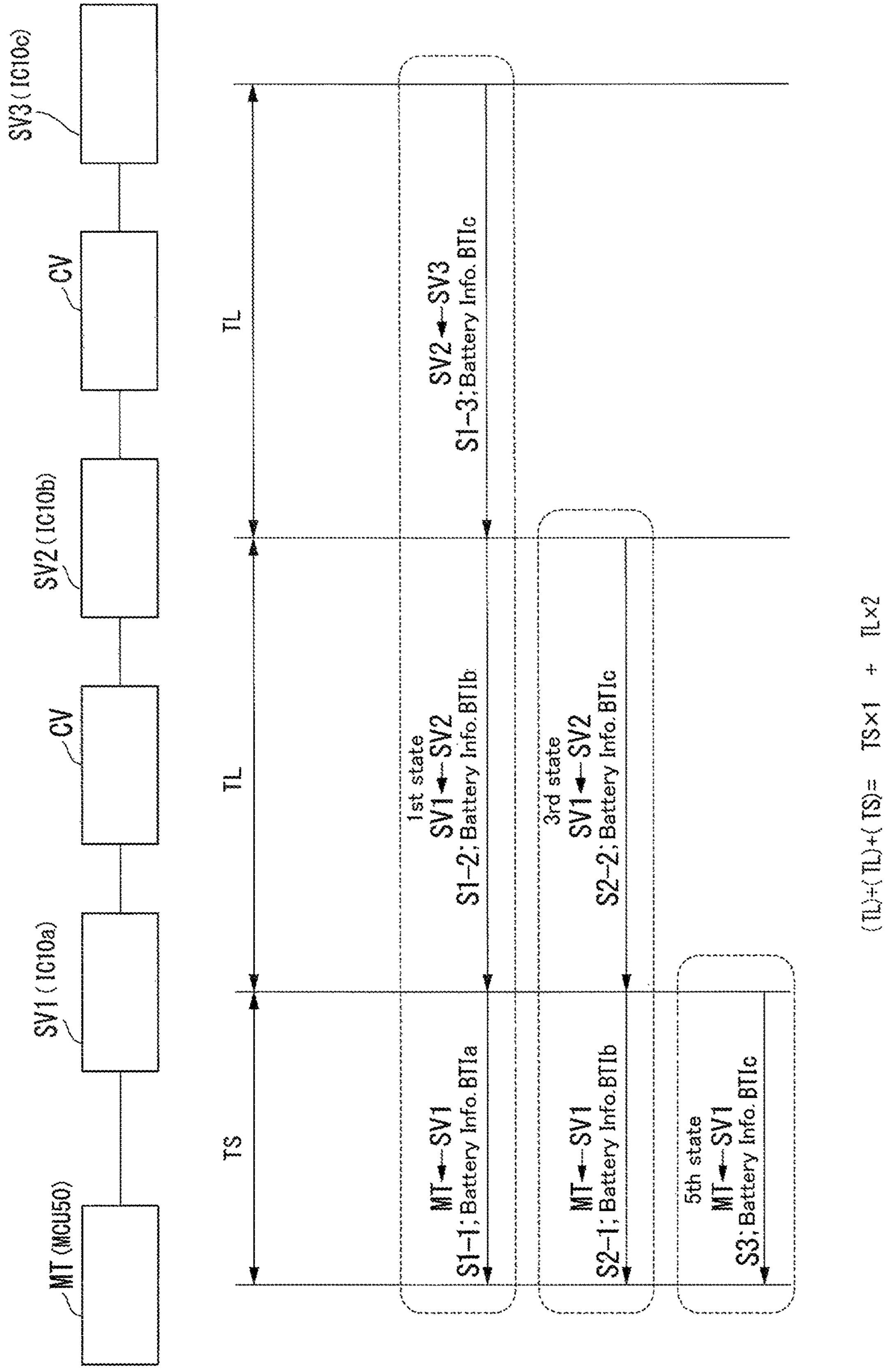
FIG. 8 is a diagram for schematically illustrating an example of a required time for serial communication in the embodiment.

FIG. 8 is a diagram for schematically illustrating an example of a required time for the serial communication in the embodiment.

Now referring to FIG. 8, description is given of the required time for the serial communication when the MCU 50 executes the instruction to transmit the battery information BTI of the battery protection ICs 10 at once. In the following description, the serial communication performed by the MCU 50 to execute the instruction to transmit the battery information BTI of the battery protection ICs 10 at once is referred to as the "serial communication in the embodiment".

As described above, communication between the MCU 50 and the battery protection IC 10*a* is not performed via the voltage converter CV. The communication between the MCU 50 and the battery protection IC 10*a* can thus be performed at a speed higher than that of communication performed via the voltage converter CV. In the following description, a time required for the communication between the MCU 50 and the battery protection IC 10*a* is notated as a "predetermined short time TS". Moreover, a time required for communication between the battery protection ICs 10 via the voltage converters CV is notated as a "predetermined long time TL". The predetermined short time TS and the predetermined long time TL indicate time s required for communication. The predetermined short time TS and the predetermined long time TL have the following relationship: (predetermined short time TS)≤(predetermined long time TL).

In FIG. 8, the processing proceeds in order of the first state, the second state (not shown), the third state, the fourth state (not shown), and the fifth state from top to bottom. As illustrated in FIG. 8, under the first state, in response to reception from the MCU 50 of the instruction to transmit the battery information BTI stored in the first storage 12-1 at once, the battery protection IC 10*a* transmits the battery information BTIa to the MCU 50 (illustrated Step S1-1). Moreover, under the first state, the battery protection IC 10*b* transmits the battery information BTIb to the battery protection IC 10*a* (illustrated Step S1-2). Moreover, under the first state, the battery protection IC 10*c* transmits the battery information BTIc to the battery protection IC 10*b* (illustrated Step S1-3). As described above, processing of Step S1-1, Step S1-2, and Step S1-3 is performed simultaneously. Hence, it takes the predetermined long time TL for the processing in the first state.

Under the second state (not shown in FIG. 8) and the fourth state (not shown in FIG. 8), a time required for processing of storing, in the first storage 12-1, the battery information BTI stored in the second storage 12-2 is sufficiently shorter than the predetermined short time TS, and is not considered as the required time for the serial communication.

As illustrated in FIG. 8, under the third state, the battery protection IC 10*a* transmits the battery information BTIb to the MCU 50 (illustrated Step S2-1). Moreover, under the third state, the battery protection IC 10*b* transmits the battery information BTIc to the battery protection IC 10*a* (illustrated Step S2-2). As described above, processing of Step S2-1 and Step S2-2 is performed simultaneously. Hence, it takes the predetermined long time TL for the processing in the third state.

As illustrated in FIG. 8, under the fifth state, the battery protection IC 10*a* transmits the battery information BTIc to the MCU 50 (illustrated Step S3). Hence, it takes the predetermined short time TS for the processing in the fifth state.

As a result, the required time for the serial communication in the embodiment is expressed as (predetermined short time TS)×1+(predetermined long time TL)×2.

<Regarding Required Time Period for Serial Communication in Related Art>

Figure 9:
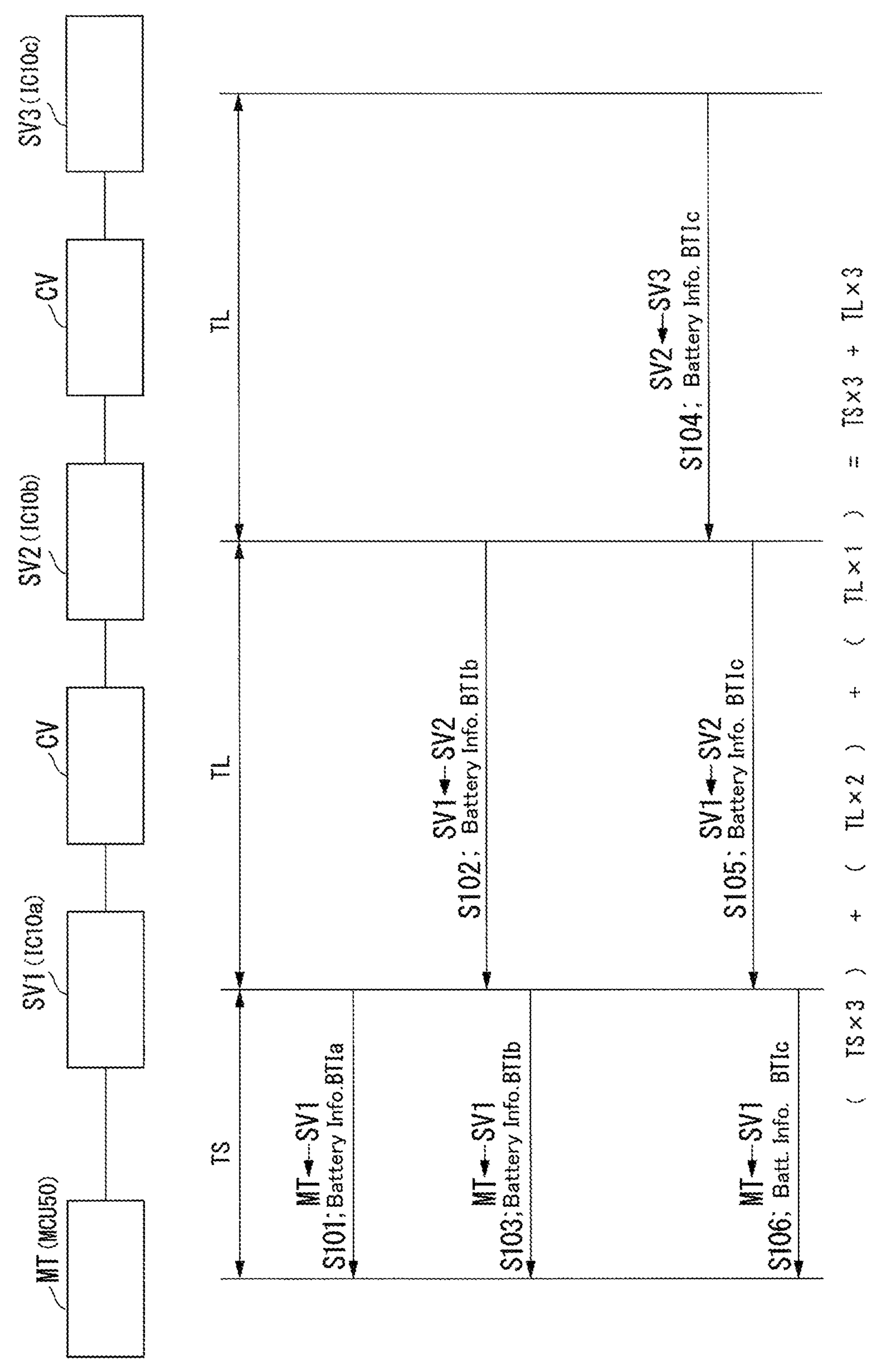
FIG. 9 is a diagram for schematically illustrating an example of a required time for serial communication according to the related art.

FIG. 9 is a diagram for schematically illustrating an example of a required time for serial communication in the related art.

Now referring to FIG. 9, a description is given of the required time that is required for the serial communication when the MCU 50 receives the battery information BTI stored in the storages 12. In the following description, the serial communication performed when the MCU 50 receives the battery information BTI stored in the storages 12 is referred to as the "serial communication in the related art". Moreover, in the example illustrated in FIG. 9, the description is given with assumption that the battery protection ICs 10 have received from the MCU 50 the instruction to transmit the battery information BTI.

In FIG. 9, the processing proceeds in order of a first step (S101) in the first state, a second step (S102), a third step (S103), a fourth step (S104), a fifth step (S105), and a sixth step (S106) from top to bottom. As illustrated in FIG. 9, the battery protection IC 10*a* transmits the battery information BTIa to the MCU 50 in response to the instruction from the MCU 50 (illustrated Step S101). This processing of Step S101 takes the predetermined short time TS.

As illustrated in FIG. 9, the battery protection IC 10*b* transmits the battery information BTIb to the MCU 50 via the battery protection IC 10*a* and the voltage converter CV in response to the instruction from the MCU 50 (illustrated Step S102 and Step S103). This processing of Step S103 takes the predetermined short time TS. Moreover, the processing of Step S102 takes the predetermined long time TL.

As illustrated in FIG. 9, the battery protection IC 10*c* transmits the battery information BTIc to the MCU 50 via the battery protection IC 10*a*, the battery protection IC 10*b*, and two voltage converters CV in response to the instruction from the MCU 50 (Step S104 to Step S106). This processing of Step S106 takes the predetermined short time TS. The processing of each of Step S104 and Step S105 takes the predetermined long time TL.

As a result, the required time for the serial communication in the processing in the first state in the related art is expressed as (predetermined short time TS)×3+(predetermined long time TL)×3. As described above, the required time for the serial communication in the embodiment is a time expressed as (predetermined short time TS)×1+(predetermined long time TL)×2. In the battery management system 1 using the battery protection ICs 10 according to the embodiment, the effect of delay caused by the voltage converters CV can thus be reduced and made shorter than that in the serial communication in the related art. Moreover, in the serial communication in the related art, there is an example in which it takes a time expressed as (predetermined long time TL)×6 or a time expressed as (predetermined long time TL)×9 to synchronize time intervals of receiving battery information. In this case, the difference further increases. Such increase in difference may occur especially when the number of battery protection ICs increases.

<Another Example of Storage 12>

In the above description, there has been described the case in which the storage 12 includes the two storage areas: the first storage 12-1 and the second storage 12-2, but the present invention is not limited thereto. The controller 11 may be constructed to transmit information stored in the storage 12 to the higher-level circuit, and then clear the storage 12 to store information received from the lower-level circuit, for example. Alternatively, the controller 11 may be constructed to overwrite the information transmitted to the higher-level circuit with the information received from the lower-level circuit in order of transmission without clearing the storage 12. In this case, the storage 12 may include one storage area.

Summary of Embodiment

As described above, the battery protection IC 10 according to the embodiment is a battery protection IC 10 which is used to construct a system (battery management system 1) configured to perform serial communication among the plurality of the battery protection ICs 10 which operate at different reference potentials and which are connected in series via a reference potential converter (voltage converter CV), the battery protection IC 10 including: a higher-level reception terminal (data reception terminal SDI_I) connected to a transmission terminal of a higher-level circuit that is adjacent in cascade connection and is configured to receive information from the higher-level circuit; a higher-level transmission terminal (data transmission terminal SDO_O) connected to a reception terminal of the higher-level circuit and is configured to transmit information to the higher-level circuit; a lower-level reception terminal (data reception terminal SDO_I) connected to a transmission terminal of a lower-level circuit that is adjacent in the cascade connection and is configured to receive information from the lower-level circuit; an acquisition device 110 configured to acquire and store transmission information (battery information BTI of its own circuit) to transmit to the higher-level circuit from the higher-level transmission terminal; and a storage 12 in which at least one of transmitted information (battery information BTI of the lower-level circuit) received by the lower-level reception terminal or the transmission information acquired and stored by the acquisition device 110 is stored, the battery protection IC 10 being configured to transmit, in response to reception of instructive information indicating an instruction for the higher-level circuit to read the transmitted information (battery information BTI), any one of the transmitted information and the transmission information from the higher-level transmission terminal to the higher-level circuit, and simultaneously receive, by the lower-level reception terminal, transmission information or transmitted information of a lower-level circuit (battery information BTI of a much lower-level circuit) transmitted from the lower-level circuit after the transmitted information.

According to the battery protection IC 10 of the embodiment, communication in communication sections (for example, between the battery protection IC 10*a* and the battery protection IC 10*b*, and between the battery protection IC 10*b* and the battery protection IC 10*c*) in which delay is caused by the voltage converters CV in the serial communication is performed simultaneously, and hence the delay corresponding to only one section occurs. The battery protection IC 10 according to the embodiment can reduce the effect of the delay caused by the voltage converters CV in the serial communication performed via the voltage converters CV. Moreover, when the battery protection ICs and the MCU 50 operate at the same reference voltage but in different voltage systems (for example, the battery protection ICs operate in an 80-V system, and the MCU 50 operates in a 5-V system), the voltage converters CV may also be provided between the battery protection IC 10*a* and the MCU 50. In this case, according to the battery management system of the embodiment, the effect of the delay caused by the voltage converters CV can also be reduced.

In the battery protection IC 10 according to the embodiment, a consideration is given to a case in which a battery unit of a plurality of battery units (battery packs BTs) connected in series is connected to its own circuit and in which the acquisition device 110 acquires, as transmission information, information (battery information BTI) indicating a cell voltage of the battery unit. In this case, it is preferred that, in the battery management system 1, the cell voltages of the battery packs BTs are acquired at the same timing. The battery protection IC 10 according to the embodiment can acquire the battery information BTI at a timing when the battery protection IC 10*a* receives the instruction from the MCU 50.

What is claimed is:

1. A battery protection integrated circuit (IC) which is used to construct a system configured to perform serial communication among a plurality of battery protection integrated circuits which operate at different reference potentials and which are connected in series via a reference potential converter, the battery protection integrated circuit comprising:

a higher-level transmission terminal connected to a reception terminal of a higher-level circuit that is adjacent in cascade connection and is configured to transmit information to the higher-level circuit;

a lower-level reception terminal connected to a transmission terminal of a first lower-level circuit that is adjacent in the cascade connection and is configured to receive information from the first lower-level circuit;

an acquisition device configured to acquire transmission information to transmit to the higher-level circuit; and at least one of a memory or a register configured to store at least one of transmitted information which is transmitted from the first lower-level circuit and the transmission information which is acquired by the acquisition device, the battery protection IC being configured to transmit, in response to reception of instructive information indicating an instruction to read one of the transmission information and the transmitted information, the one of the transmitted information and the transmission information via the higher-level transmission terminal to the higher-level circuit, and simultaneously receive, by the lower-level reception terminal, one of transmission information of the first lower-level circuit and transmitted information stored in the first lower-level circuit transmitted from a second lower-level circuit that is lower than the first lower-level circuit.

2. The battery protection integrated circuit according to claim 1, further comprising a plurality of battery packs connected in series, wherein one of the plurality of battery packs is connected to the battery protection integrated circuit, and wherein the acquisition device is configured to acquire, as the transmission information, information indicating a cell voltage of the one of the plurality of battery packs.

3. A battery management system, comprising:

a plurality of the battery protection integrated circuits according to claim 1; and a master device, the master device and the plurality of the battery protection integrated circuit performing serial communication with one another, of a first time relating to reception by the master device of transmission information acquired by a battery protection integrated circuit other than a battery protection IC that is adjacent to the master device in cascade connection, and a second time relating to reception by the master device of transmission information acquired by the battery protection integrated circuit that is adjacent to the master device of the plurality of the battery protection integrated circuits which are cascade-connected the second time being shorter than the first time.

4. A battery management system, comprising:

a plurality of the battery protection integrated circuits according to claim 2; and a master device, the master device and the plurality of the battery protection integrated circuits performing serial communication with one another, of a first time relating to reception by the master device of transmission information acquired by a battery protection IC other than a battery protection integrated circuit that is adjacent to the master device in cascade connection, and a second time relating to reception by the master device of transmission information acquired by the battery protection integrated circuit that is adjacent to the master device of the plurality of the battery protection ICs which are cascade-connected the second time being shorter than the first time.

5. The battery protection integrated circuit according to claim 1, wherein the battery protection IC is further configured to receive, via the higher-level transmission terminal, the instructive information indicating the instruction to read the one of the transmission information and the transmitted information.

6. The battery protection integrated circuit according to claim 1, wherein the one of the transmitted information and the transmission information comprise digital data.

7. The battery protection integrated circuit according to claim 1, wherein the battery protection IC is further configured to transmit the one of the transmitted information and the transmission information in synchronization with a clock signal.

8. The battery protection integrated circuit according to claim 7, wherein the battery protection IC is further configured to transmit the one of the transmitted information and the transmission information in synchronization with at least one of a rising or a falling of the clock signal.

* * * * *